(12) United States Patent
Pan et al.

(10) Patent No.: US 10,476,941 B2
(45) Date of Patent: Nov. 12, 2019

(54) SYSTEMS AND METHODS FOR INTERACTING WITH MEDIA DEVICES

(71) Applicant: Facebook, Inc., Menlo Park, CA (US)

(72) Inventors: Christopher Chun-Ning Pan, Seattle, WA (US); Francislav P. Penov, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 56 days.

(21) Appl. No.: 15/358,074

(22) Filed: Nov. 21, 2016

(65) Prior Publication Data
US 2018/0145987 A1    May 24, 2018

(51) Int. Cl.
*H04L 29/06*       (2006.01)
*H04L 29/08*       (2006.01)
*G06Q 50/00*       (2012.01)

(52) U.S. Cl.
CPC .............. *H04L 67/10* (2013.01); *H04L 63/08* (2013.01); *H04L 63/10* (2013.01); *H04L 67/36* (2013.01); *G06Q 50/01* (2013.01)

(58) Field of Classification Search
CPC .............. H04L 65/403; H04L 65/4076; H04L 12/1822; H04L 29/06027; H04L 65/4092; H04L 65/602; H04L 65/607; H04L 51/08; H04L 51/16; H04L 67/104; H04L 65/00; H04L 65/1089; H04L 65/4084; H04L 67/18; H04L 67/20; H04L 67/42; H04L 63/08; H04L 65/60; H04L 67/10; H04L 67/36; H04L 63/10; G06Q 50/00
USPC ............................................ 726/22, 4, 26, 3
See application file for complete search history.

(56) References Cited

U.S. PATENT DOCUMENTS

| | | | |
|---|---|---|---|
| 2009/0313684 A1* | 12/2009 | Shah | G06F 21/335 726/7 |
| 2013/0125212 A1* | 5/2013 | Lee | H04N 21/4122 726/4 |
| 2014/0067828 A1* | 3/2014 | Archibong | H04L 65/4084 707/748 |
| 2016/0266747 A1* | 9/2016 | Leatham | G06F 3/048 |

* cited by examiner

*Primary Examiner* — Mahfuzur Rahman
(74) *Attorney, Agent, or Firm* — Sheppard Mullin Richter & Hampton LLP

(57) ABSTRACT

Systems, methods, and non-transitory computer-readable media can receive at least one request for performing one or more operations, the request originating from a media application running on a media device, the request being broadcasted by the media device over a network to which the computing device is also connected. Information describing the request can be provided through a software application running on the computing device. A determination is made when user operating the computing device has approved the request. The operations are performed by at least the software application running on the computing device.

20 Claims, 9 Drawing Sheets

SYSTEMS AND METHODS FOR INTERACTING WITH MEDIA DEVICES

FIELD OF THE INVENTION

The present technology relates to the field of interacting with computing devices (or systems). More particularly, the present technology relates to techniques for interacting with media devices.

BACKGROUND

Today, people often utilize computing devices (or systems) for a wide variety of purposes. Users can use their computing devices to, for example, interact with one another, create content, share information, and access information. In some instances, a user can interact with media devices (e.g., smart televisions, digital media players, or other over-the-top devices) using one or more software applications running on a computing device.

SUMMARY

Various embodiments of the present disclosure can include systems, methods, and non-transitory computer readable media configured to receive at least one request for performing one or more operations, the request originating from a media application running on a media device, the request being broadcasted by the media device over a network to which the computing device is also connected. Information describing the request can be provided through a software application running on the computing device. A determination is made when user operating the computing device has approved the request. The operations are performed by at least the software application running on the computing device.

In some embodiments, the request corresponds to a request for sharing content through a social networking account of the user.

In some embodiments, the request corresponds to a request for using a display screen of the computing device as a second screen.

In some embodiments, the user is logged into a user account through the software application running on the computing device.

In some embodiments, the user is not logged into a user account through the media application running on the media device.

In some embodiments, the systems, methods, and non-transitory computer readable media are configured to present an authentication code included with the request through a display screen of the computing device, the authentication code also being presented on a display screen accessible to the media application.

In some embodiments, the systems, methods, and non-transitory computer readable media are configured to cause content included with the request to be posted through a social networking account of the user in a social networking system, the content being published by the social networking system in one or more newsfeeds.

In some embodiments, the systems, methods, and non-transitory computer readable media are configured to present additional content through a display screen of the computing device based at least in part on the request, the additional content being specified by the media application.

In some embodiments, the additional content includes one or more options for interacting with at least the media application running on the media device.

In some embodiments, the systems, methods, and non-transitory computer readable media are configured to determine that the user has selected at least one option for accessing additional content through a display screen accessible to the media application, the option being selected through the software application running on the computing device and cause the display screen accessible to the media application to present the additional content.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
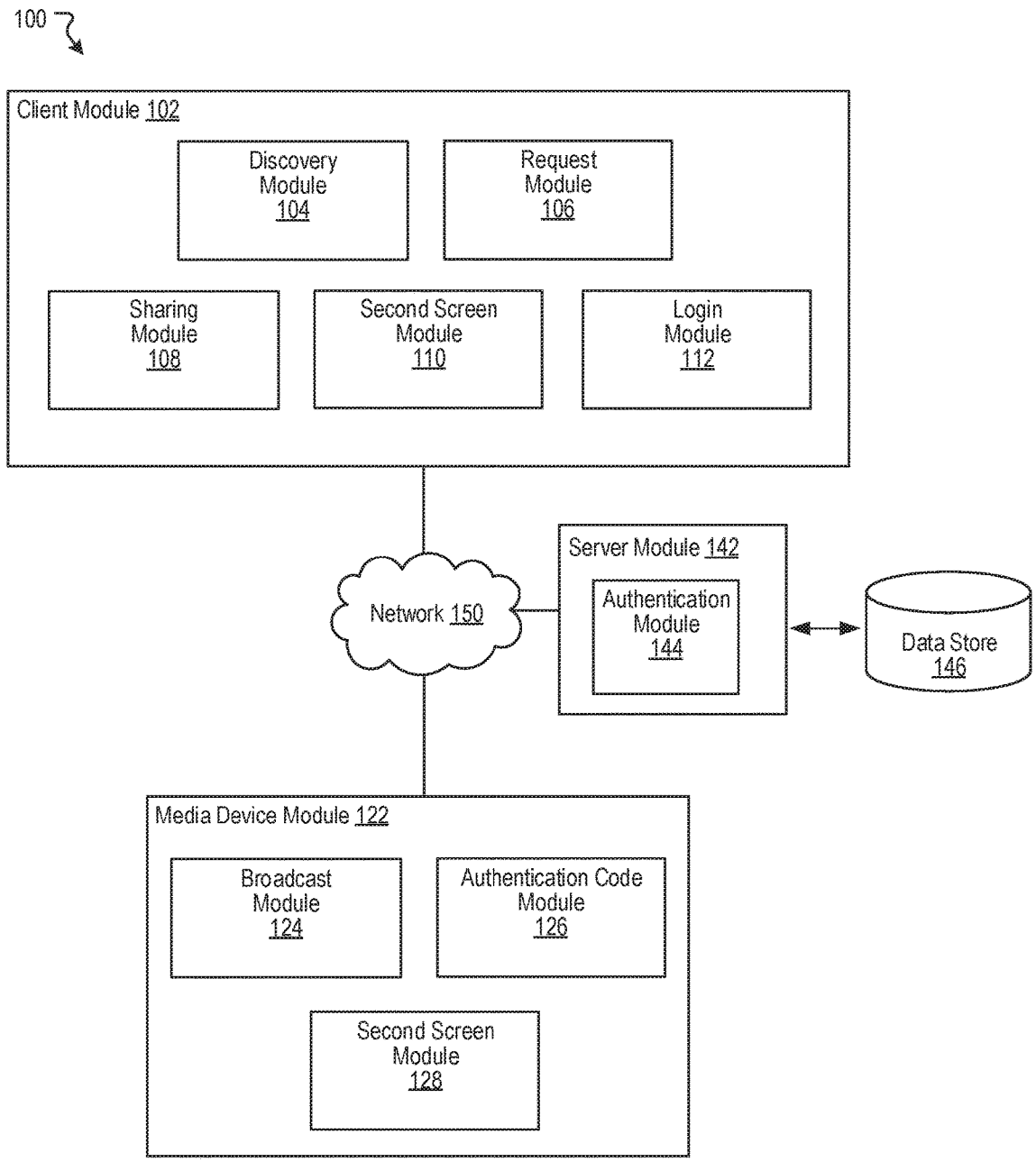
FIG. 1 illustrates an example system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Interacting with Media Devices

People use computing devices (or systems) for a wide variety of purposes. As mentioned, a user can interact with one or more media devices (e.g., smart televisions, digital media players, or other over-the-top devices) using a computing device. In some instances, such media devices may be running software applications that provide additional functionality if the user logs into a user account before accessing the software application. For example, a user accessing a gaming application running on a media device can be asked to create a user account so that the user's game progress can be saved and resumed. In some instances, an application may provide its own login system through which the user can provide login credentials (e.g., email and password) to access the user's account. Once authenticated, the application can provide various functionality that is customized for the user.

In some instances, a software application running on a media device may be configured to rely on a third-party system to authenticate the user. In one example, the application can request authentication by displaying an authentication code on a display screen (e.g., television) of the media device. This authentication code may be provided to the media device by the third-party system. The user can proceed with the authentication process by accessing a uniform resource locator (URL) that was also displayed with the authentication code (e.g., http://www.example.com/authenticate). For example, the user can access a website referenced by the URL through a web browser that is running on a computing device (e.g., mobile phone). The user can then provide the authentication code through an input field in the website. In this example, when providing the authentication code, the user may also be required to login to the user's account that is hosted by the third-party system. Once authenticated, the third-party system can provide a notification to the application (or media device) to indicate that the user has been authenticated. In some instances, the third-party system can provide an access token directly to the media device. The application running on the media device can use this access token for purposes of interacting with the third-party system, for example, through various application programming interfaces (APIs). In one example, the application can access the user's social networking account through the APIs as authorized by the user. Such approaches generally require the user to expend additional effort to enable the various functionality of applications running on a media device. One example of such effort involves the user having to manually input an authentication code to authorize various operations by an application running on the media device. Moreover, these existing approaches can also limit the ways in which computing devices and media devices can interact with one another. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a media device (or an application running on the media device) can broadcast requests over a network, e.g., Bluetooth, Wi-Fi, etc. In one example, these requests may be broadcasted to obtain access to a display screen of a user's computing device (e.g., mobile phone, tablet, etc.) for use as a second screen. In another example, the requests may be broadcasted to obtain permission to access a user's account on a third-party system. For example, a gaming application running on the media device may request access to the user's account on a social networking system for purposes of sharing the user's game progress with social connections (or friends).

In some embodiments, such request broadcasts can be detected by a software application (e.g., social networking application) running on a computing device that is connected to the same network. When a request is detected, the software application can present information describing the request through a display screen of the computing device. The user operating the computing device can determine whether to approve or deny the request. In some embodiments, to ensure that the user is granting access to the correct media device (or application), the media device can present an authentication code through a display screen (e.g., television) of the media device. This authentication code can also be transmitted by the media device to the user's computing device over the network. In such embodiments, the software application running on the computing device can display the authentication code to the user. If the authentication code being displayed on the television matches the authentication code being displayed through the display screen of the computing device, then the user can be assured that the correct media device (or application) is being granted access.

After access is granted, the media device (or the application running on the media device) can perform various operations as permitted by the user. For example, in some embodiments, the application is permitted to utilize the display screen of the user's computing device as a second screen. This second screen may be used by the application to present additional content or options, for example. In another example, the application running on the media device may be permitted by the user to post content to a social networking system through the user's social networking account. In yet another example, the application (e.g., social networking application) running on the computing device can use the display screen (e.g., television) of the media device as a second screen, for example, to access additional content.

FIG. 1 illustrates an example system 100, according to an embodiment of the present disclosure. As shown in the example of FIG. 1, the system 100 can include a client module 102, a media device module 122, and a server module 142. In some instances, the example system 100 can include at least one data store 146. In various embodiments, the client module 102, the media device module 122, and the server module 142 can interact with one another over one or more networks 150 (e.g., the Internet, a local area network, etc.). In various embodiments, the network 150 can be any wired or wireless computer network through which devices can exchange data. For example, the computer network can be a personal area network, a local area network, or a wide area network, to name some examples. Naturally, any generally known techniques may be used to enable electronic communication between devices including Bluetooth, Wi-Fi, infrared (IR) communication, to name some examples. The components (e.g., modules, elements, etc.) shown in this figure and all figures herein are exemplary only, and other implementations may include additional, fewer, integrated, or different components. Some components may not be shown so as not to obscure relevant details.

In some embodiments, the client module 102, the media device module 122, and/or the server module 142 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the client module 102, the media device module 122, and/or the server module 142, can be implemented, in part or in whole, as software running on one or more computing devices or systems, such as on a user- or client computing device. For example, the client module 102 and/or the server module 142, in their entirety or at least a portion thereof, can be implemented as or within an application (e.g., app), a program, or an applet, etc., running on a user computing device or a client computing system, such as the user device 610 of FIG. 6. Further, the server module 142, or at least a portion thereof, can be implemented using one or more computing devices or systems that include one or more servers, such as network servers or cloud servers. In some instances, the server module 142 can, in part or in whole, be implemented within or configured to operate in conjunction with a social networking system (or service), such as the social networking system 630 of FIG. 6. Additionally, the media device module 122, or at least a portion thereof, can be implemented in one or more applications running on media devices (e.g., smart televisions, digital media players, or other over-the-top devices). In some instances, the media device module 122 can, in part or in whole, be implemented within or configured to operate in conjunction with a third-party system (or service), such as the external system 620 of FIG. 6.

Furthermore, in some embodiments, the server module 142 can be configured to communicate and/or operate with the at least one data store 146, as shown in the example system 100. The at least one data store 146 can be configured to store and maintain various types of data including, for example, login data for authenticating users (e.g., users of the social networking system). In various embodiments, the at least one data store 146 can store content items (e.g., stories, images, links, electronic advertisements, etc.). In some implementations, the at least one data store 146 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 146 can store information associated with users, such as user identifiers, user information, profile information, user specified settings, content produced or posted by users, and various other types of user data.

As shown in the example of FIG. 1, the client module 102 can include a discovery module 104, a request module 106, a sharing module 108, a second screen module 110, and a login module 112. The media device module 122 can include a broadcast module 124, an authentication code module 126, and a second screen module 128. The server module 142 can include an authentication module 144.

In some embodiments, the media device module 122 can be implemented in various types of media devices (e.g., smart televisions, digital media players, or other over-the-top devices) and/or in software applications (or applications) running on such media devices. In general, a media device is capable of running applications that can perform operations such as streaming content and/or playing games, for example. In such embodiments, the media device and/or applications running on the media device can utilize the media device module 122 to request access to perform various operations. In one example, an application ("media application") may request access to post various content through the user's account in a social networking system. In another example, the media application may request use of a display screen of the user's computing device as a second screen. To enable such functionality, in some embodiments, the media application can use the broadcast module 124 to broadcast one or more requests over the network 150. A request can include various information describing the media application from which the request originated including the name of the media application, the name of the media device on which the media application is running, the name of the network, e.g., Wi-Fi hotspot, through which the media application is connecting, to name some examples. The request can also include information describing the operation(s) for which the media application is requesting access to perform (e.g., sharing request, second screen request, login request, etc.). In some embodiments, the broadcast module 124 implements generally known techniques for enabling service and/or device discovery. In such embodiments, the broadcast module 124 is capable of communicating with other devices (e.g., computing devices, printers, etc.) that are also connected to the same network 150.

In some embodiments, each request sent by the broadcast module 124 includes a corresponding authentication code (e.g., an alphanumeric string of characters). In general, an authentication code can be used to confirm the source (e.g., media device, application, network, etc.) of a request as described below. In some embodiments, the authentication code generated (or obtained) for a request automatically expires once the request is approved or denied by a user of a computing device. In some embodiments, the media application can utilize the authentication code module 126 to obtain an authentication code from a third-party system (e.g., social networking system) in which the server module 142 is implemented. In such embodiments, the server module 142 can utilize the authentication module 144 to generate (or obtain) the authentication code. The server module 142 can then provide generated authentication code to the media device module 122 over the network 150. Once an authentication code is received, the broadcast module 124 can include the authentication code with the corresponding request that is being transmitted over the network 150. In some embodiments, the server module 142 is implemented in a social networking system (e.g., the social networking system 630 of FIG. 6) that is accessible over a network, e.g., the network 150. Depending on the computing environment, the computing system in which the server module 142 is implemented may be accessible over a different network than the network 150.

In some embodiments, the client module 102 is implemented in an application ("client application") that is running on a computing device (e.g., mobile phone, tablet, etc.). In some embodiments, the application is a social networking application. The client application can utilize the discovery module 104 to detect requests being broadcasted over the network 150. For example, the discovery module 104 can be configured to periodically poll the network 150 for requests that are being broadcasted. Such polling may be performed at fixed time intervals (e.g., every 30 seconds, every minute, etc.) and/or when a user operating the computing device launches the client application. When a request is detected, the request module 106 can evaluate the request to extract information that was included in the request. Such information can describe the media application from which the request originated including, for example, the name of the media application, the name of the media device on which the media application is running, the name of the network, e.g., Wi-Fi hotspot. The request module 106 can also determine the operation(s) for which the media application is requesting access to perform. This information can be presented through the client application running on the user's computing device. The user operating the computing device then has the option to approve or deny the request.

In some embodiments, the request corresponds to a request to share information through the user's social networking account. For example, the media application may be a game application that is requesting access to share the user's game progress through a social networking system. In some embodiments, the sharing module 108 in the computing device can determine that the request corresponds to a request to share information. The sharing module 108 can present information describing this request through the client application running on the user's computing device. In some embodiments, the client application also presents a corresponding authentication code that was included with the request. In such embodiments, the media application from which the request originated can cause the same authentication code to be presented on a display screen (e.g., television) that is accessible to the media device on which the media application is running. The user operating the computing device can reference the authentication code being displayed through the display screen of the computing device to identify which media device and/or media application is requesting access. Such confirmation using the authentication code can help ensure that unknown or malicious media applications are not allowed to perform operations through the user's social networking account. The user can approve or deny the request to share of information through the user's social networking account depending on whether the authentication code presented through the display screen of the media device and the authentication code presented through the display screen of the computing device match.

In some embodiments, if the sharing request is approved, the sharing module 108 can communicate information describing such authorization to the server module 142. In such embodiments, the authentication module 144 is configured to generate an access token that can be used to access the user's social networking account. The server module 142 can provide the generated access token to the media device module 122. In some instances, the media device module 122 may be configured to poll the server module 142 to obtain the access token. The media device module 122 can use this access token when submitting information to be shared through the user's social networking account, for example, through one or more application programming interfaces (APIs) provided by the social networking system. If the access token provided by the media device module 122 is valid, the social networking system can permit the submitted information to be shared through the user's social networking account. In one example, the information is posted as a content item which appears in the respective news feeds of other users of the social networking system that are social connections of the user. In some embodiments, the access token can be used to perform only those operations that were authorized by the user when approving the sharing request. For example, the access token may be used to share information for a specified number of instances (e.g., approval of a one-time share) before the access token expires. In another example, the access token may be used to share information over a specified time period (e.g., a number of hours, days, weeks, etc.) before the access token expires.

In some embodiments, the request corresponds to a request to use the display screen of the user's computing device as a second screen. In general, a second screen can be used by a media application to provide various features and/or functionality in addition to what is already being presented on a display screen (e.g., television) of the media device in which the media application is running. For example, the media application may be a content streaming application that is requesting access to provide additional functionality through the second screen. In one example, when requesting the second screen, the media application may provide instructions to launch a web browser on the user's computing device and to redirect the web browser to an account management interface through which the user is able to manage account settings (e.g., managing a content queue, updating billing preferences, etc.). In some embodiments, the second screen module 110 in the computing device can determine that the request corresponds to a second screen request. The second screen module 110 can present information describing this request through the client application running on the user's computing device. In some embodiments, the client application also presents a corresponding authentication code that was included with the request. In such embodiments, the media application from which the request originated can cause the same authentication code to be presented on a display screen (e.g., television) that is accessible to the media device on which the media application is running. The user operating the computing device can reference the authentication code being displayed through the display screen of the computing device to identify which media device and/or media application is requesting access, as described above.

In some embodiments, if the second screen request is approved, the second screen module 110 can communicate information describing such authorization to the server module 142. In such embodiments, the authentication module 144 is configured to generate (or obtain) an access token that can be used to communicate with the second screen module 110, as described above. The media device module 122 can use this access token when interacting with the second screen module 110. If the access token provided by the media device module 122 is valid, the second screen module 110 can permit the media application to use the user's computing device as a second screen. In some embodiments, once the second screen request is approved, the client module 102 can interact with the second screen module 128 to access the display screen of the media device as a second screen. In one example, the client application running on the user's computing device can provide additional content to be presented through the display screen of the media device over the network 150.

In some embodiments, the request corresponds to an authentication request for the user. For example, the media application may rely on a social networking system to authenticate the user. In this example, a social networking application through which the user is logged into the social networking system may be running on the user's computing device. In some embodiments, the login module 112 in the computing device can determine that the request corresponds to a login request. The login module 112 can present information describing this request through the social networking application running on the user's computing device. In some embodiments, the social networking application also presents a corresponding authentication code that was included with the request. In such embodiments, the media application from which the request originated can cause the same authentication code to be presented on a display screen (e.g., television) that is accessible to the media device on which the media application is running. The user operating the computing device can reference the authentication code being displayed through the display screen of the computing device to identify which media device and/or media application is requesting access, as described above. In some embodiments, if the login request is approved through the social networking application, the login module 112 can communicate information describing such authorization to the server module 142. In such embodiments, the authentication module 144 can send information authenticating the user to the media application. The media application can provide the user with a customized experience once this confirmation is received.

Figure 2A:
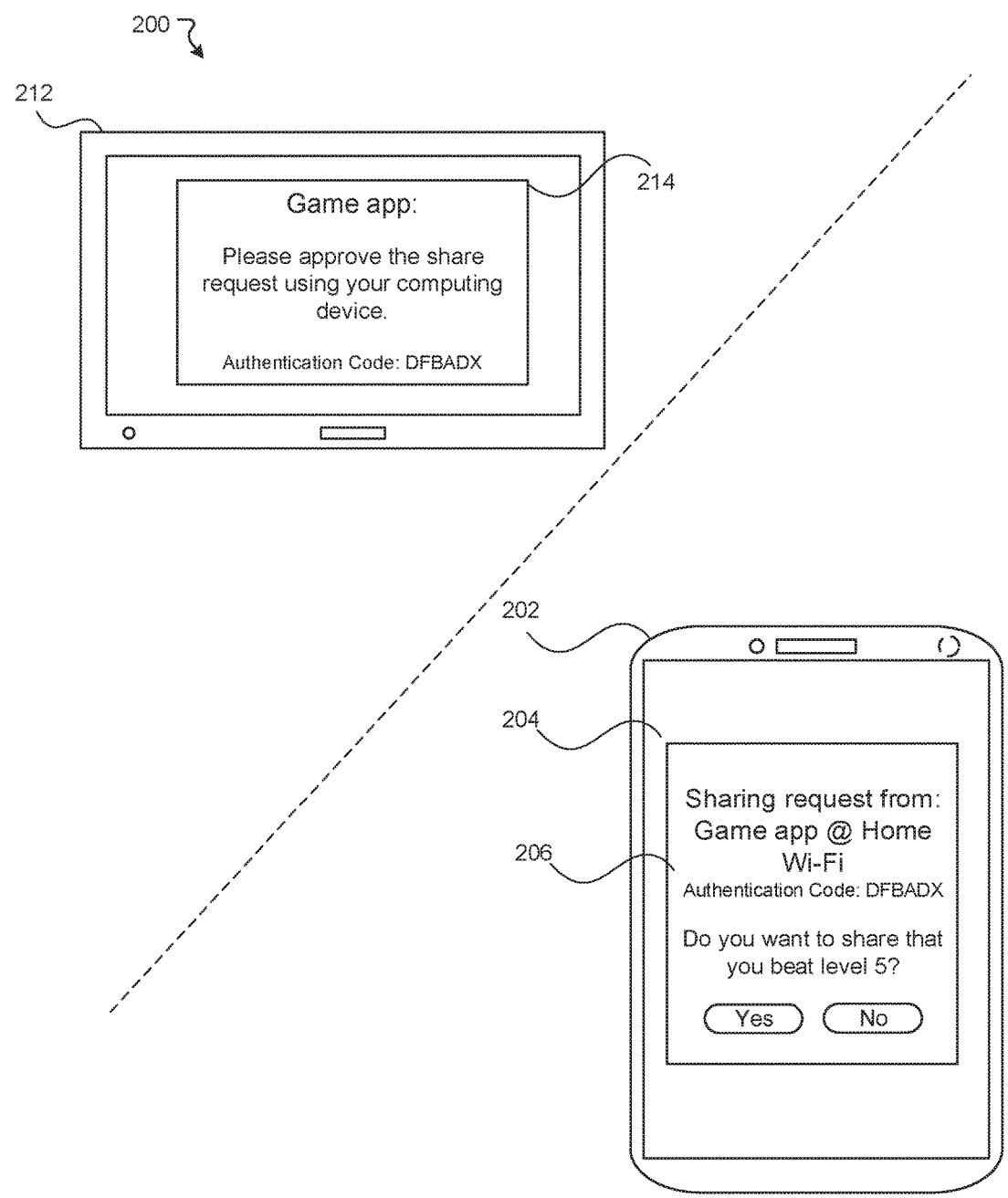
FIGS. 2A-B illustrate example diagrams showing content sharing between devices, according to an embodiment of the present disclosure.
Figure 2B:
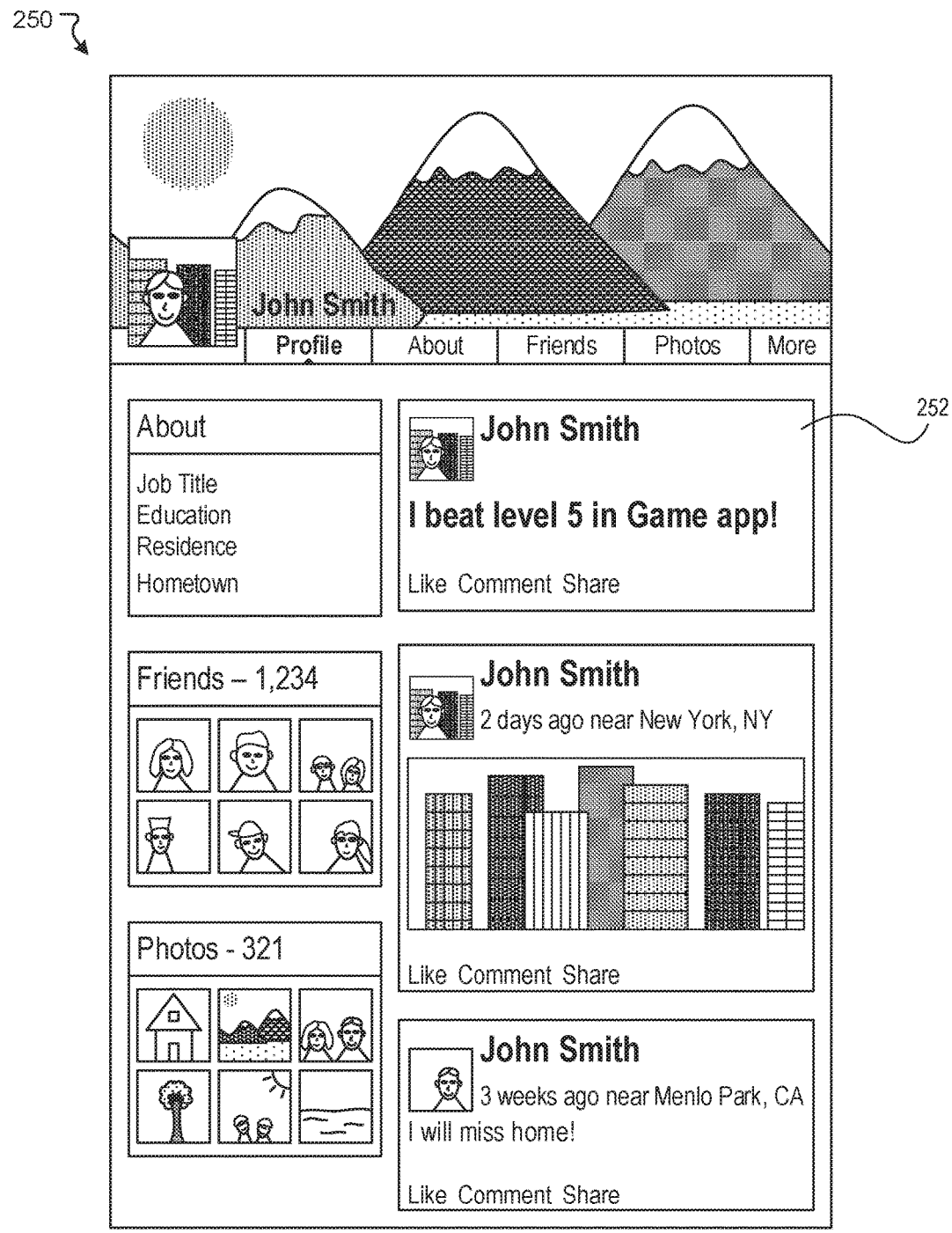

FIG. 2A illustrates an example 200 of a sharing request 204 being presented, according to an embodiment of the present disclosure. In this example, the sharing request 204 originates from a media application running on a media device. When the sharing request 204 is sent, the media application can cause information 214 describing the request to be presented on a display screen 212 of the media device. The information 214 can include instructions for enabling the sharing and also the authentication code associated with the sharing request. As described above, this sharing request 204 can also be presented through a display screen of a computing device 202 that detected the request. Further, the sharing request 204 may be provided through an interface of an application (e.g., a social networking application, web browser, etc.) running on the computing device 202. In the example of FIG. 2A, the sharing request 204 includes information identifying the media application (e.g., "Game app") from which the sharing request originates, the network (e.g., "Home Wi-Fi") being accessed by the media application, and the authentication code included with the request. The sharing request 204 also indicates the information 206 to be shared through the user's social networking account (e.g., "Do you want to share that you beat level 5?"). In some instances, there may be multiple requests (e.g., sharing requests, second screen requests, etc.) from various media applications. In some embodiments, these requests can presented through the display screen of the computing device 202 as a list of requests. The user operating the computing device 202 can then approve or deny each of the individual requests. In the example of FIG. 2A, the user operating the computing device 202 has approved the sharing request 204. As a result, the information is shared through the user's social networking account, as illustrated in the example of FIG. 2B. The example of FIG. 2B illustrates a social profile page 250 of the user that is published by the social networking system. As shown in FIG. 2B, the information to be shared has been posted as a content item 252 in the user's newsfeed. In some embodiments, the content item 252 is also posted in the respective newsfeeds of the user's social connections.

Figure 3A:
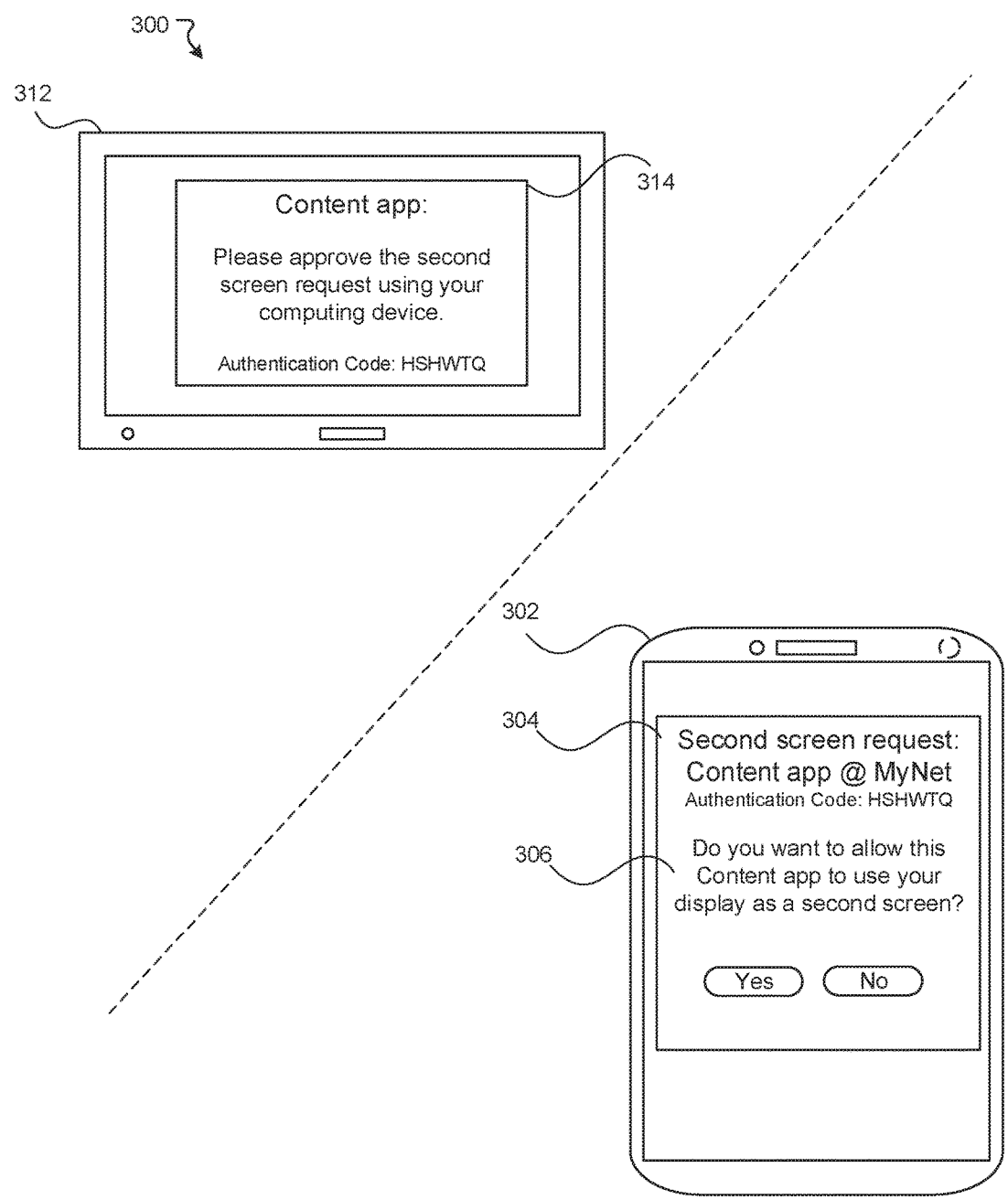
FIGS. 3A-B illustrate example diagrams showing a second screen interface, according to an embodiment of the present disclosure.
Figure 3B:
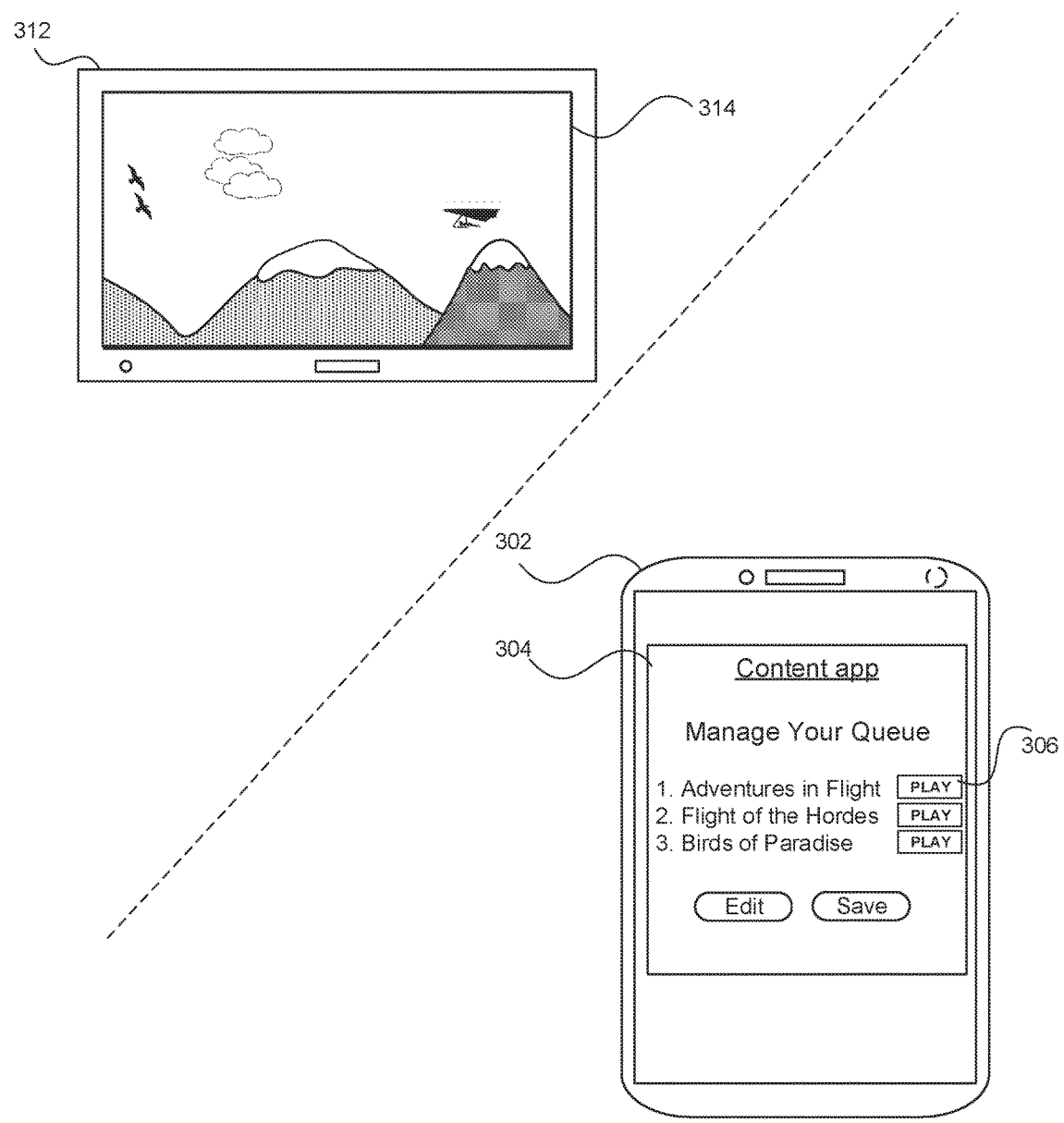

FIG. 3A illustrates an example 300 of a second screen request 304 being presented, according to an embodiment of the present disclosure. In this example, the second screen request 304 originates from a media application running on a media device. When the second screen request 304 is sent, the media application can cause information 314 describing the request to be presented on a display screen 312 of the media device. The information 314 can include instructions for enabling the second screen and also the authentication code associated with the second screen request. As described above, this second screen request 304 can also be presented through a display screen of a computing device 302 that detected the request. Further, the second screen request 304 may be provided through an interface of an application (e.g., a social networking application, web browser, etc.) running on the computing device 302. In the example of FIG. 3A, the second screen request 304 includes information identifying the media application (e.g., "Content app") from which the sharing request originates, the network (e.g., "MyNet") being accessed by the media application, and the authentication code included with the request. In the example of FIG. 3A, the user operating the computing device 302 has approved the second screen request 304. As a result, the display screen of the computing device 302 is able to be used by the media application as a second screen, as illustrated in the example of FIG. 3B. The example of FIG. 3B shows the media application streaming content 314 through the display screen 312 of the media device. In this example, the media application is also using the display screen of the computing device 302 as a second screen to provide various functionality. Here, the display screen of the computing device 302 is being used to present an interface 304 that includes options for managing the user's content queue. In some embodiments, the computing device 302 is also able to use the display screen 312 of the media device as a second screen. For example, the user operating the computing device 302 can select an option 306 to cause a content item to be played through the display screen 312 of the media device. In another example, the user operating the computing device 302 may access a newsfeed through the social networking application running on the computing device 302. In this example, the newsfeed may include a content item (e.g., a post) that describes a new show that is accessible through the media application (e.g., "Content app") along with an option to stream the show through a media device. Here, the user can select the option to cause the show to be streamed through the display screen 312 which serves as a second screen for the computing device 302.

Figure 4:
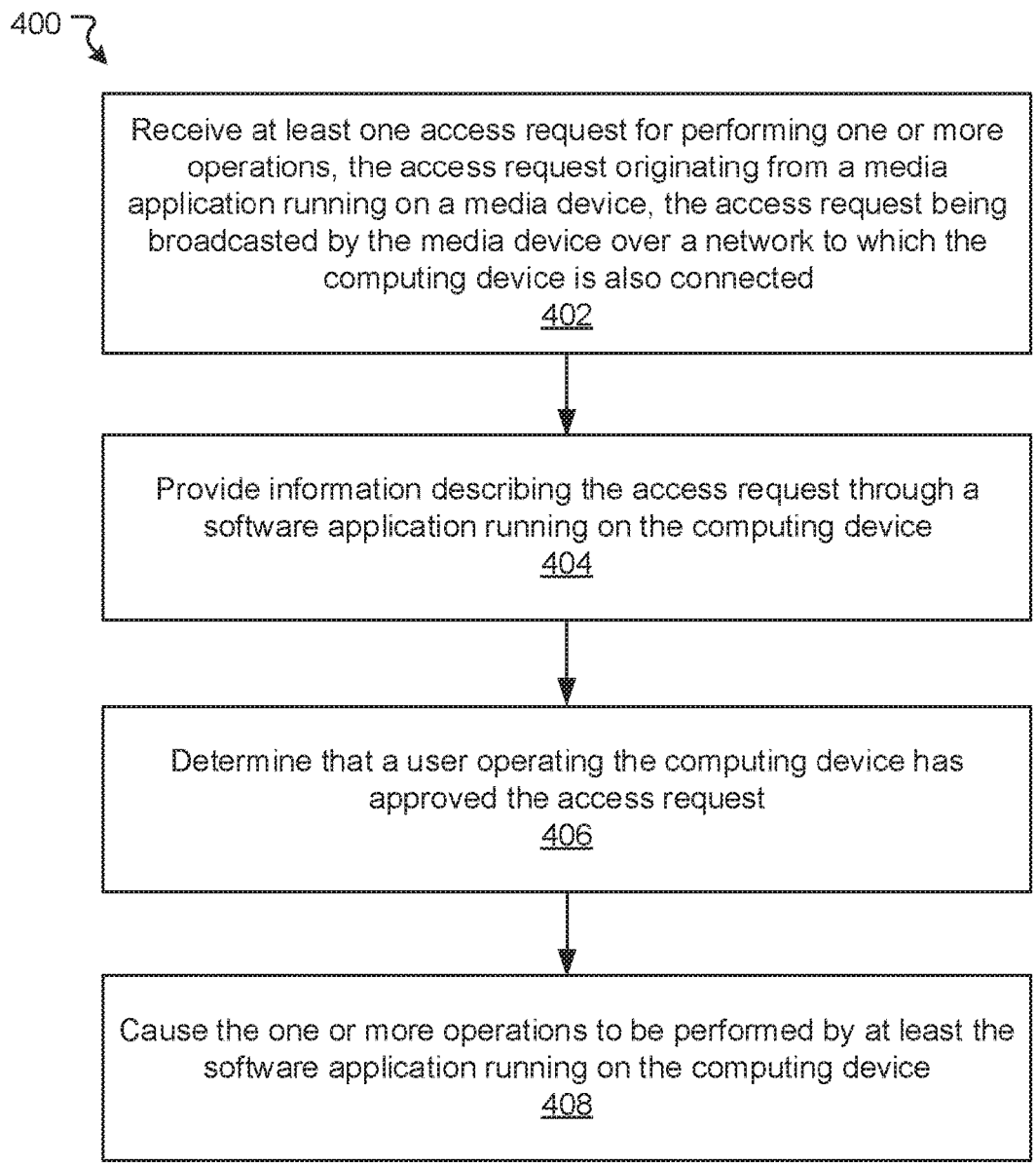
FIG. 4 illustrates an example process for interacting with media devices, according to an embodiment of the present disclosure.

FIG. 4 illustrates an example process 400 for interacting with media devices, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can determine at least one request for performing one or more operations, the request originating from a media application running on a media device, the request being broadcasted by the media device over a network to which the computing device is also connected. At block 404, information describing the request can be provided through a software application running on the computing device. At block 406, a determination is made when user operating the computing device has approved the request. At block 408, the operations are performed by at least the software application running on the computing device.

Figure 5:
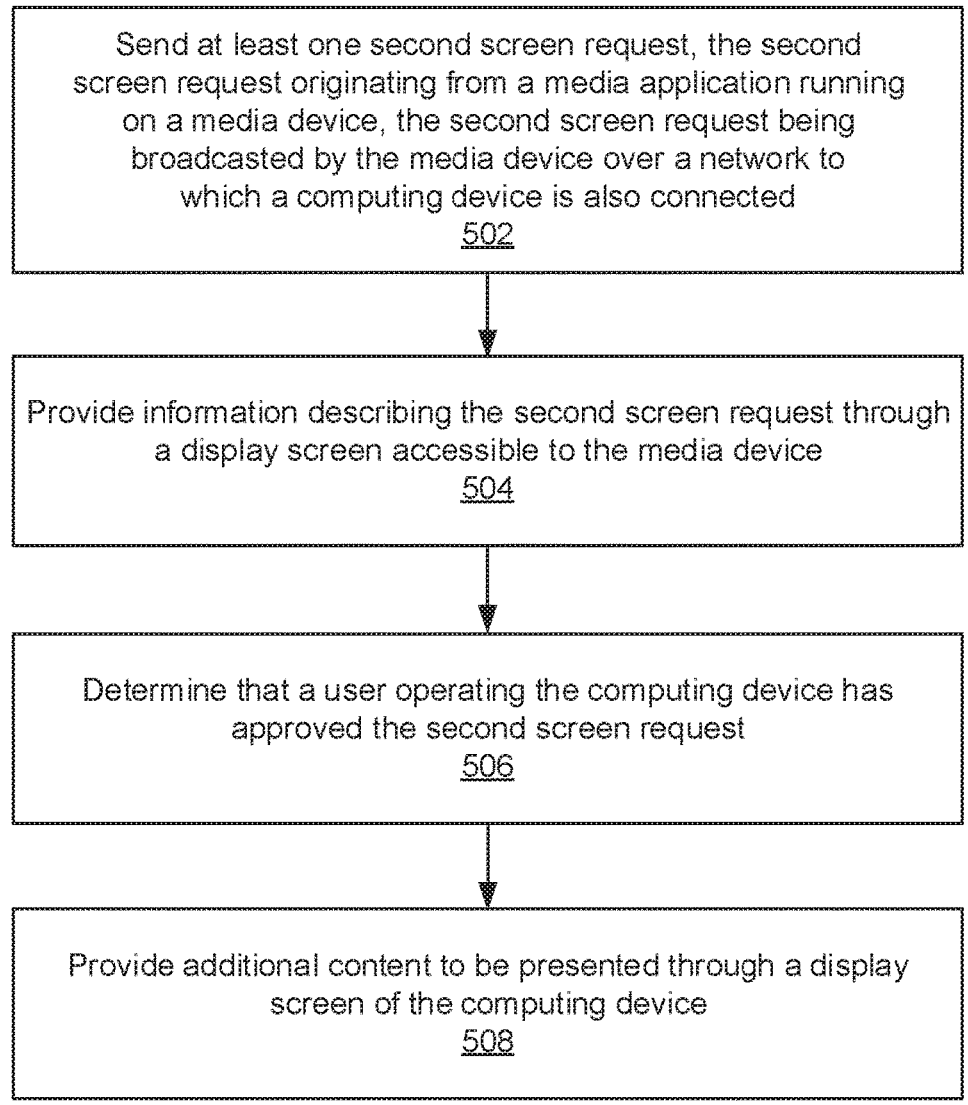
FIG. 5 illustrates another example process for interacting with media devices, according to an embodiment of the present disclosure.

FIG. 5 illustrates an example process 500 for interacting with an automated answering system, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can send at least one second screen request, the second screen request originating from a media application running on a media device, the second screen request being broadcasted by the media device over a network to which a computing device is also connected. At block 504, information describing the second screen request is provided through a display screen accessible to the media device. At block 506, a determination is made that a user operating the computing device has approved the second screen request. At block 508, additional content to be presented through a display screen of the computing device is provided.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
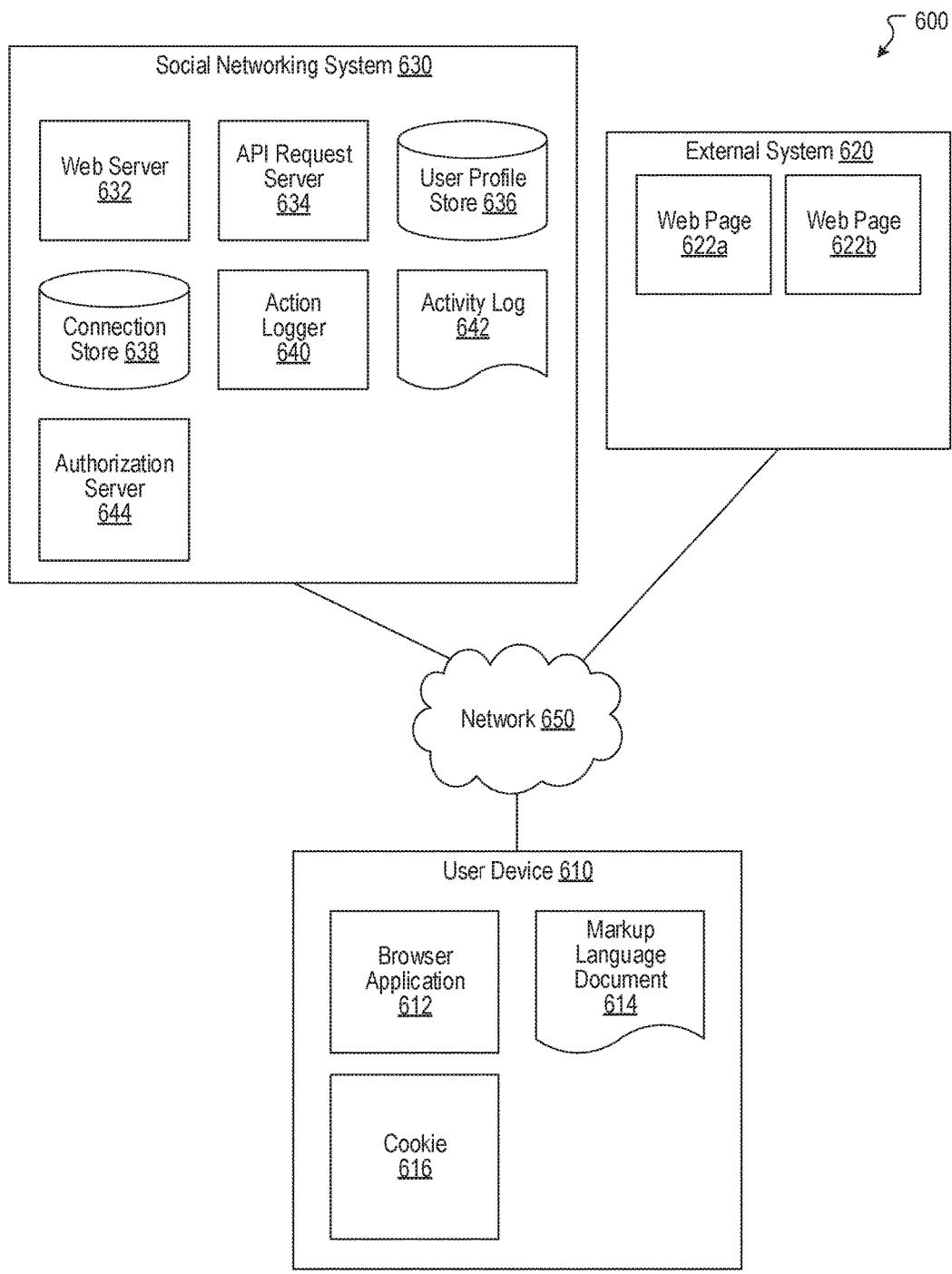
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include the client module 102 of FIG. 1, the social networking system 630 can include the server module 142 of FIG. 1, and the external system 620 can include the media device module 122 of FIG. 1. As discussed previously, it should be appreciated that there can be many variations or other possibilities.

Hardware Implementation

Figure 7:
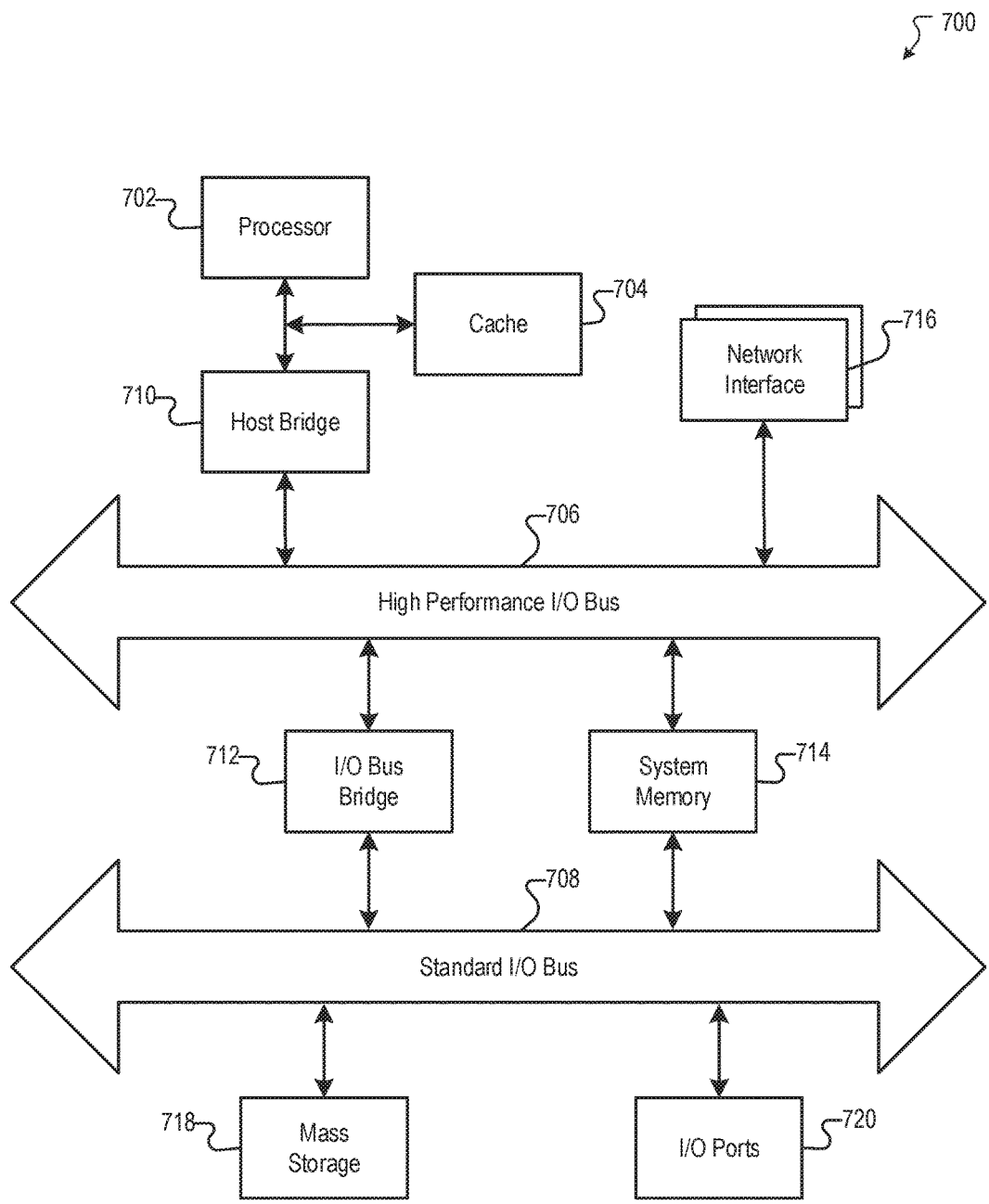
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing device, at least one request for performing one or more operations, the request originating from a media application running on a media device, the request being broadcasted by the media device over a network to which the computing device is also connected, wherein the request corresponds to a request for sharing content through a social networking account of a user operating the computing device, wherein the request includes an authentication code and information identifying the media application from which the request originates;
providing, by the computing device, information describing the request through a software application running on the computing device, wherein the providing further comprises presenting the authentication code through a display screen of the computing device, the authentication code also being presented on a display screen accessible to the media application;
determining, by the computing device, that the user operating the computing device has approved the request; and
causing, by the computing device, the one or more operations to be performed by at least the software application running on the computing device.

2. The computer-implemented method of claim 1, wherein the request corresponds to a request for using the display screen of the computing device as a second screen.

3. The computer-implemented method of claim 1, wherein the user is logged into the social networking account through the software application running on the computing device.

4. The computer-implemented method of claim 1, wherein the user is not logged into the social networking account through the media application running on the media device.

5. The computer-implemented method of claim 1, wherein causing the one or more operations to be performed by at least the software application running on the computing device further comprises:
causing, by the computing device, content included with the request to be posted through the social networking account of the user in a social networking system, the content being published by the social networking system in one or more newsfeeds.

6. The computer-implemented method of claim 1, wherein causing the one or more operations to be performed by at least the software application running on the computing device further comprises:
presenting, by the computing device, additional content through the display screen of the computing device based at least in part on the request, the additional content being specified by the media application.

7. The computer-implemented method of claim 6, wherein the additional content includes one or more options for interacting with at least the media application running on the media device.

8. The computer-implemented method of claim 1, the method further comprising:
determining, by the computing device, that the user has selected at least one option for accessing additional content through the display screen accessible to the media application, the option being selected through the software application running on the computing device; and
causing, by the computing device, the display screen accessible to the media application to present the additional content.

9. A system comprising:
at least one processor; and
a memory storing instructions that, when executed by the at least one processor, cause the system to perform:
receiving at least one request for performing one or more operations, the request originating from a media application running on a media device, the request being broadcasted by the media device over a network to which a computing device is also connected, wherein the request corresponds to a request for sharing content through a social networking account of a user operating the computing device, wherein the request includes an authentication code and information identifying the media application from which the request originates;
providing information describing the request through a software application running on the computing device, wherein the providing further comprises presenting the authentication code through a display screen of the computing device, the authentication code also being presented on a display screen accessible to the media application;
determining that the user operating the computing device has approved the request; and
causing the one or more operations to be performed by at least the software application running on the computing device.

10. The system of claim 9, wherein the request corresponds to a request for using the display screen of the computing device as a second screen.

11. The system of claim 9, wherein the user is logged into the social networking account through the software application running on the computing device.

12. The system of claim 9, wherein the user is not logged into the social networking account through the media application running on the media device.

13. The system of claim 9, wherein causing the one or more operations to be performed by at least the software application running on the computing device further comprises:
causing content included with the request to be posted through the social networking account of the user in a social networking system, the content being published by the social networking system in one or more newsfeeds.

14. The system of claim 9, wherein causing the one or more operations to be performed by at least the software application running on the computing device further comprises:
presenting, by the computing device, additional content through the display screen of the computing device based at least in part on the request, the additional content being specified by the media application.

15. A non-transitory computer-readable storage medium including instructions that, when executed by at least one processor of a computing system, cause the computing system to perform:
receiving at least one request for performing one or more operations, the request originating from a media application running on a media device, the request being broadcasted by the media device over a network to which a computing device is also connected, wherein the request corresponds to a request for sharing content through a social networking account of a user operating the computing device, wherein the request includes an authentication code and information identifying the media application from which the request originates;

providing information describing the request through a software application running on the computing device, wherein the providing further comprises presenting the authentication code through a display screen of the computing device, the authentication code also being presented on a display screen accessible to the media application;

determining that the user operating the computing device has approved the request; and causing the one or more operations to be performed by at least the software application running on the computing device.

16. The non-transitory computer-readable storage medium of claim 15, wherein the request corresponds to a request for using the display screen of the computing device as a second screen.

17. The non-transitory computer-readable storage medium of claim 15, wherein the user is logged into the social networking account through the software application running on the computing device.

18. The non-transitory computer-readable storage medium of claim 15, wherein the user is not logged into the social networking account through the media application running on the media device.

19. The non-transitory computer-readable storage medium of claim 15, wherein causing the one or more operations to be performed by at least the software application running on the computing device further comprises:

causing content included with the request to be posted through the social networking account of the user in a social networking system, the content being published by the social networking system in one or more newsfeeds.

20. The non-transitory computer-readable storage medium of claim 15, wherein causing the one or more operations to be performed by at least the software application running on the computing device further comprises:

presenting, by the computing device, additional content through the display screen of the computing device based at least in part on the request, the additional content being specified by the media application.

* * * * *